(No Model.)
R. MOONEY.
WHEEL.
No. 432,833. Patented July 22, 1890.
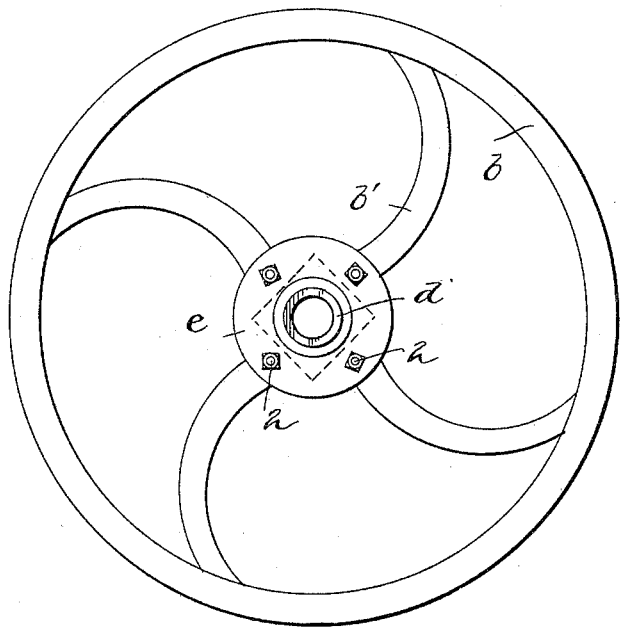
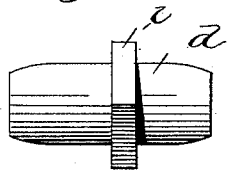
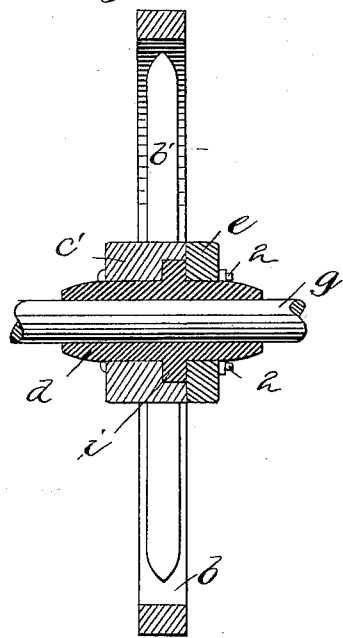
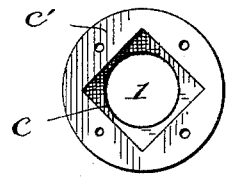
Witnesses
W. P. Keene
F. L. Middleton
Inventor
Richard Mooney
by Spear & Suly
Attys

UNITED STATES PATENT OFFICE.

RICHARD MOONEY, OF SHARON, PENNSYLVANIA.

WHEEL.

SPECIFICATION forming part of Letters Patent No. 432,833, dated July 22, 1890.

Application filed June 2, 1890. Serial No. 353,981. (No model.)

*To all whom it may concern:*

Be it known that I, RICHARD MOONEY, a citizen of the United States of America, residing at Sharon, in the county of Mercer and State of Pennsylvania, have invented certain new and useful Improvements in Wheels, of which the following is a specification.

The object of my invention is to provide a wheel with a removable supplemental hub, so that when one hub becomes worn and useless it can be replaced easily with a new hub to render the wheel as serviceable again as a new one.

In the drawings, Figure 1 is a side elevation, and Fig. 2 a vertical section, of the wheel. Fig. 3 is a side view of the removable hub, and Fig. 4 a side view of the hub.

In the drawings, $b$ represents the felly, $b'$ the spokes, and $c'$ the main hub. The felly and spokes may be of any ordinary form. The main hub is chambered out at $c$, and has an opening $l$ extending through it. The supplemental hub $d$ is inserted in this opening, and a flange $i$ on said hub $d$ fits the chamber or recess in the main hub, the outer surface being flush. The supplemental hub is bored out to receive the shaft $g$. The exterior form of the supplemental hub is square, and over the projecting end is slipped a collar $e$, which fits up against the sides of the main hub $c'$ and the flange on the supplemental hub. All the parts are held together by bolts 2, passing through the main hub and collar and through notches in the flange.

It will be readily seen that the supplemental hub may be easily removed and a new one put in its place.

The collar may be, if desired, cast with the supplemental hub.

I claim as my invention—

In combination, a wheel having a chambered main hub, a supplemental hub having a flange $i$, adapted to said chamber, a collar $e$, and bolts for holding all the parts together, substantially as described.

In testimony whereof I affix my signature in presence of two witnesses.

RICHARD MOONEY.

Witnesses:
   A. W. WILLIAMS,
   JOHN MCCLURE.